United States Patent
Chen et al.

(10) Patent No.: US 10,334,023 B2
(45) Date of Patent: Jun. 25, 2019

(54) CONTENT DISTRIBUTION METHOD, SYSTEM AND SERVER

(71) Applicant: TENCENT TECHNOLOGY (SHENZHEN) COMPANY LIMITED, Shenzhen (CN)

(72) Inventors: Jie Chen, Shenzhen (CN); Hong Chang Zhou, Shenzhen (CN); Pu Cai, Shenzhen (CN); Sheng Yu Yin, Shenzhen (CN); Xiao Jie Dong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 873 days.

(21) Appl. No.: 14/449,293

(22) Filed: Aug. 1, 2014

(65) Prior Publication Data
US 2014/0351376 A1 Nov. 27, 2014

Related U.S. Application Data

(63) Continuation of application No. PCT/CN2014/072835, filed on Mar. 4, 2014.

(30) Foreign Application Priority Data

Mar. 5, 2013 (CN) .......................... 2013 1 0069065

(51) Int. Cl.
*H04L 29/08* (2006.01)
(52) U.S. Cl.
CPC .......... *H04L 67/10* (2013.01); *H04L 67/1004* (2013.01)
(58) Field of Classification Search
USPC ................................ 709/217–219, 225, 232
See application file for complete search history.

(56) References Cited

U.S. PATENT DOCUMENTS 6,327,611 B1 * 12/2001 Everingham ........ G06Q 10/107
707/999.01
6,393,458 B1 * 5/2002 Gigliotti ................ G06F 9/505
707/999.01

(Continued)

FOREIGN PATENT DOCUMENTS

| CN | 101237418 A | 8/2008 |
| CN | 101277248 A | 10/2008 |
| CN | 101500016 A | 8/2009 |

OTHER PUBLICATIONS

Guomin, Zhang, Xing Changyou, and Chen Ming. "A distributed multimedia CDN model with P2P architecture." In Communications and Information Technologies, 2006. ISCIT'06. International Symposium on, pp. 152-156. IEEE, 2006.*

(Continued)

*Primary Examiner* — Suraj M Joshi
*Assistant Examiner* — Melaku Y Habtemariam
(74) *Attorney, Agent, or Firm* — Knobbe Martens Olson & Bear LLP

(57) ABSTRACT

The present invention discloses a content distribution method, system and a server. In one embodiment, the method includes: receiving a content distribution request form a client; obtaining all receiving ends designated by the content distribution request, and marking at least a portion of the receiving ends with a first status code; judging whether all the at least a portion of the receiving ends complete the distribution task, if not, controlling an internal distribution process until all the at least a portion of the receiving ends complete the distribution task.

18 Claims, 8 Drawing Sheets

(56) References Cited

U.S. PATENT DOCUMENTS

| | | | |
|---|---|---|---|
| 8,447,801 B1* | 5/2013 | Roche | H04L 67/306 707/736 |
| 2006/0020560 A1* | 1/2006 | Rodriguez | G06Q 20/401 705/75 |
| 2009/0055547 A1* | 2/2009 | Hudson | D01D 5/423 709/231 |
| 2010/0261424 A1 | 10/2010 | Mittal et al. | |
| 2011/0041136 A1* | 2/2011 | Messier | G06F 9/5066 718/105 |
| 2011/0093534 A1* | 4/2011 | Souza | H04L 67/104 709/203 |
| 2011/0243024 A1* | 10/2011 | Osterling | H04L 67/104 370/252 |
| 2012/0317197 A1* | 12/2012 | De Foy | H04L 67/1063 709/204 |

OTHER PUBLICATIONS

State Intellectual Property Office of the People's Republic of China, "Office Action", dated Nov. 28, 2016.

\* cited by examiner

CONTENT DISTRIBUTION METHOD, SYSTEM AND SERVER

CROSS REFERENCE

The application is a U.S. continuation application under 35 U.S.C. § 111(a) claiming priority under 35 U.S.C. §§ 120 and 365(c) to International Application No. PCT/CN2014/072835 filed Mar. 4, 2014, which claims the priority benefit of CN patent application serial No. 201310069065.7, titled "content distribution method, system and server" and filed on Mar. 5, 2013, the contents of which are incorporated by reference herein in their entirety for all intended purposes.

TECHNICAL FIELD

The present invention relates to data transmission techniques, and more particularly to a content distribution method, a content distribution system and a server for performing the content distribution method.

BACKGROUND

Internet data centers (IDC) are internet-based facilities for hosting and maintaining various data collecting, storing, processing and sending devices, which provides various internet services to the users. Generally, large-scale internet services may depend on one or more IDCs. Especially for some areas whose network environments are complex, an internet service should be deployed in several IDCs that are separately connected to different networks to provide the quickest access rate for the users. In addition, even in a same IDC, an internet service should be deployed in multiple servers to improve the load capacity.

In a known deployment process, a peer-to-peer manner is employed to send a file or other contents from a source terminal to all the target terminals, separately. When there are multiple target terminals, the content should be send many times, and thus the transmission rate is limited by the processing capacity and the network bandwidth of the source terminal.

SUMMARY

To improve content distribution efficiency in one or more IDCs, embodiments provided in this disclosure provides a content distribution method, a content distribution system and a server for performing the content distribution method.

A content distribution method is provided for being executed by a content distribution network (CDN) or an internet data center (IDC) to perform a content distribution task. The method includes the following steps: receiving a content distribution request form a client; obtaining all receiving ends designated by the content distribution request, and marking at least a portion of the receiving ends with a first status code, which indicates a transmission status of waiting for a transmission source; judging whether all the at least a portion of the receiving ends complete the distribution task, if not repeating the following steps until all the at least a portion of the receiving ends complete the distribution task; selecting a first receiving end from the at least a portion of the receiving ends; selecting a first source end from available source ends for the first receiving end, wherein the available source ends comprise the client and receiving ends in the at least a portion of the receiving ends that complete the transmission; sending a transmission instruction to the first source end for controlling the first source end to send content to be distributed to the first receiving end; and querying a transmission status of the first receiving end and marking the first receiving end with a second status code, which indicates a transmission status of transmission completed, after the first receiving end completing the distribution task.

A server in a content distribution network (CDN) or an internet data center (IDC) is provided. The server includes memory; one or more processor; and one or more modules stored in the memory and configured for being executed by the one or more processor, causing the server to perform above method.

A content distribution system deployed in one or more content distribution networks (CDN) or one or more internet data centers (IDC) is provided, the system includes a client, an internal controlling server and at least one receiving end.

The client is configured for sending a content distribution request to the internal controlling server. The internal controlling server is configured for performing the above method.

By marking the transmission status of the receiving ends, the above method, server and system could employ a receiving end that having a transmission status of "transmission completed" as a source end. As a result, the number of the source ends increases as the distribution process continues, a transmission rate increases gradually, and distribution efficiency is improved significantly.

The above description is only an overview of the technical solutions of the present invention. In order to understand the technical solutions of the present invention more clearly, implement the technical solutions of the present invention according to the following specification, and make the purpose, the characteristics, and the advantages of the present invention more easily to understand, hereinafter, combined with accompanying drawings, embodiments of the present invention are described as follows.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF PREFERRED EMBODIMENTS

The terminology used in the description of the present invention herein is for the purpose of describing particular examples only and is not intended to be limiting of the present invention. As used in the description of the present invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The following embodiments provide a content distribution method, a server for performing the content distribution method, and a content distribution system. The method, server and system are configured for distribution content in a content distribution network (CDN), or one or more IDCs.

The above CDN is a network system connected via the internet and the network system includes a plurality of servers, which individually provides same contents for the clients.

The IDC is a network system including a plurality of servers. IDCs can be divided into general IDCs and virtual IDCs. General IDCs are IDCs whose devices, such as servers, routes, databases, are connected with each other via a local area network (LAN). Virtual IDCs are IDCs in which internet connection is required to connect devices together. For example, multiple general IDCs can be connected together via the internet to constitute a virtual IDC, or a number of servers are connected together via the internet to constitute a virtual IDC.

Figure 1:
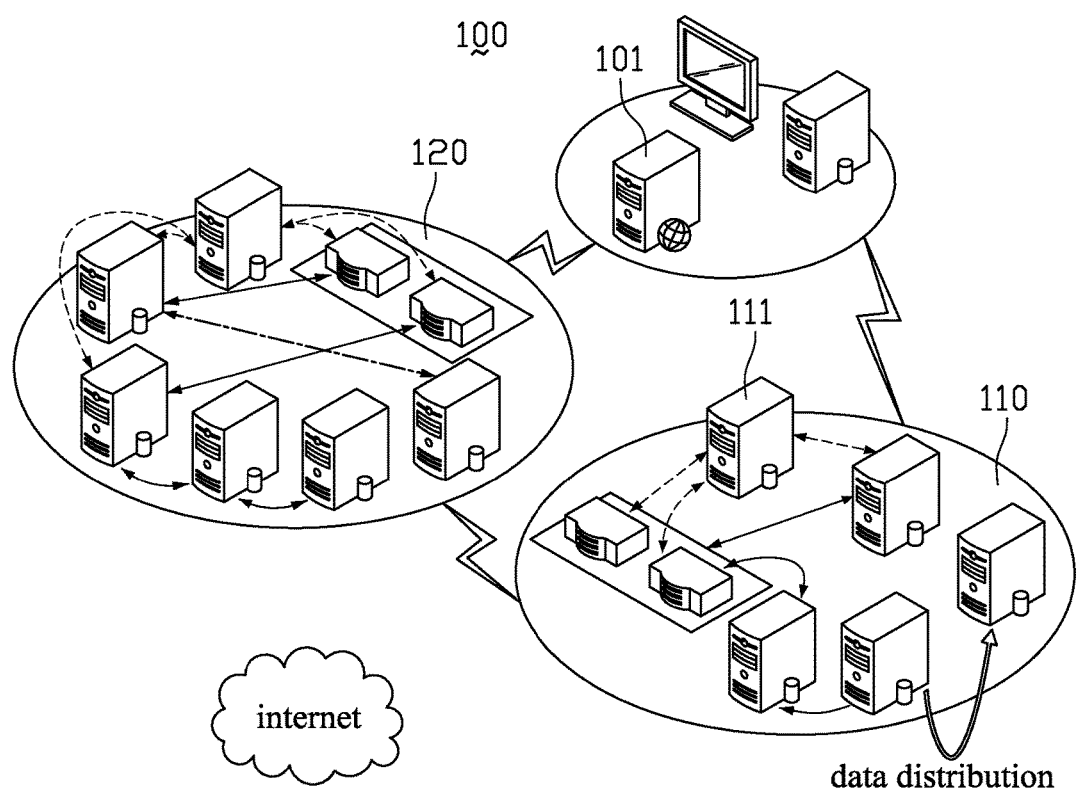
FIG. 1 is a schematic diagram of a virtual IDC.

FIG. 1 is a schematic diagram of a virtual IDC. As shown in FIG. 1, a virtual IDC 100 includes a first IDC 110 and a second IDC 120. The first IDC 110 and the second IDC 120 are the above general IDCs. The first IDC 110 and the second IDC 120 are connected with each other via the public internet. FIG. 1 only illustrated two IDCs. However, it is to be noted that the virtual IDC 100 may further includes more IDCs.

FIG. 1 further shows a distribution controlling server 101, which is configured for assisting the execution of the method provided in the following embodiments. In addition, each of the IDC in the virtual IDC 100 includes a number of servers 111.

Figure 2:
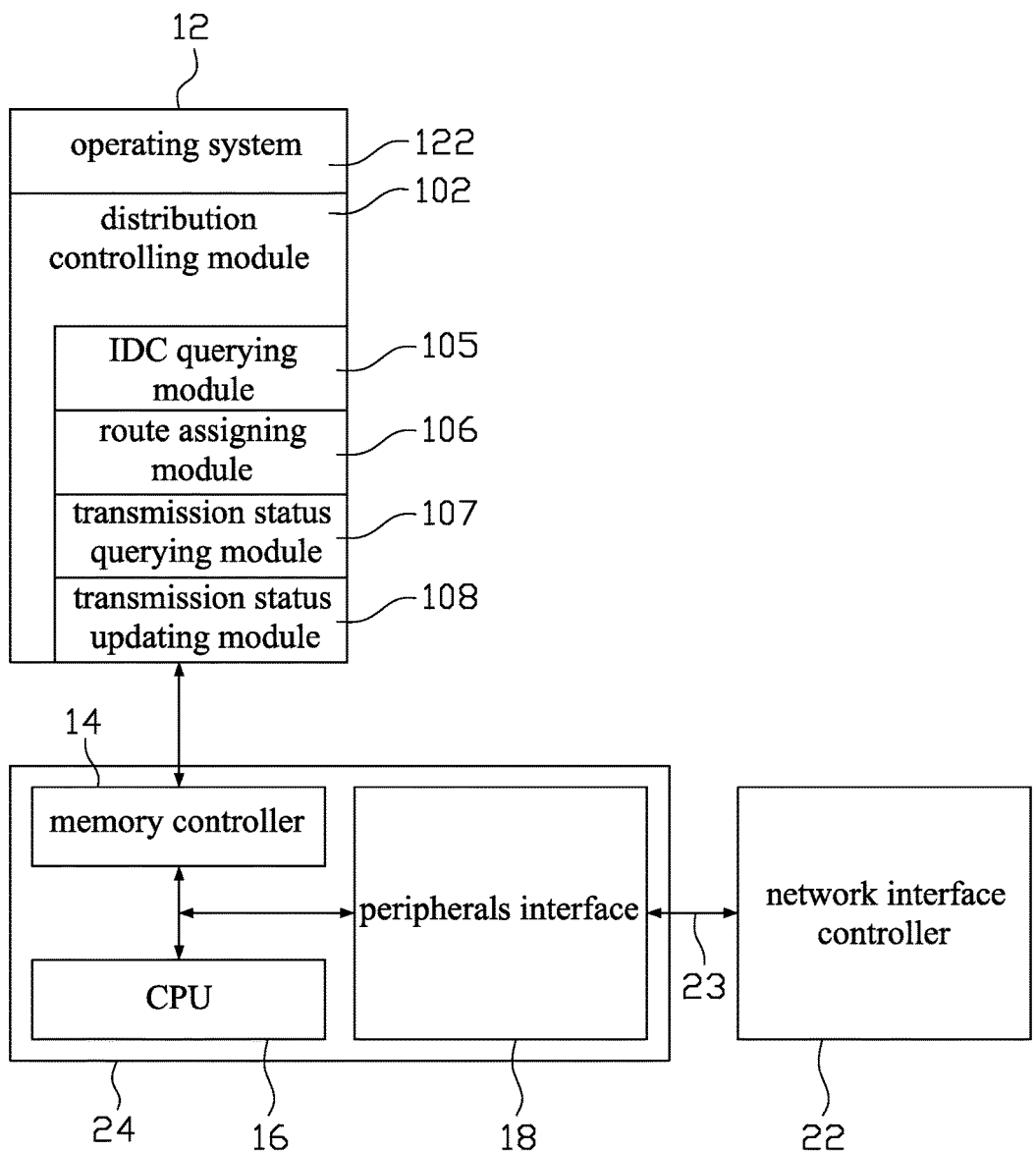
FIG. 2 is a block diagram of a server in the virtual IDC shown in FIG. 1.

FIG. 2 illustrates the server 101, according to some embodiments of the disclosure. The server 100 includes a memory 12, a memory controller 14, one or more processing units (CPU's) 16, a peripherals interface 18, and a network interface controller 22. These components communicate over the one or more communication buses or signal lines 23. It should be appreciated that the server 101 is only one example of a server, and that the server 101 may have more or fewer components that shown, or a different configuration of components. The various components shown in FIG. 2 may be implemented in hardware, software or a combination of both hardware and software, including one or more signal processing and/or application specific integrated circuits.

The memory 12 may include high speed random access memory and may also include non-volatile memory, such as one or more magnetic disk storage devices, flash memory devices, or other non-volatile solid state memory devices. In some embodiments, the memory 12 may further include storage remotely located from the one or more processors 16, for instance network attached storage accessed via network interface controller 110 and a communications network (not shown) such as the Internet, intranet(s), Local Area Networks (LANs), Wireless Local Area Networks (WLANs), Storage Area Networks (SANs) and the like, or any suitable combination thereof. Access to the memory 12 by other components of the server 101, such as the CPU 16 and the peripherals interface 18 may be controlled by the memory controller 14.

The peripherals interface 18 couples the input and output peripherals of the device to the CPU 16 and the memory 12. The one or more processors 16 run various software programs and/or sets of instructions stored in the memory 12 to perform various functions for the server 101 and to process data.

In some embodiments, the peripherals interface 18, the CPU 16, and the memory controller 14 may be implemented on a single chip, such as a chip 24. In some other embodiments, they may be implemented on separate chips.

The network interface controller 22 receives and sends network signals. The network interface controller 22 converts electrical signals/optical signals/electromagnetic waves and communicates with other devices such as other servers or routers. As such, the server 101 may receive a web request through the network interface controller 22 and send data to a client using the network interface controller 22.

In some embodiments, there are software components stored in the memory 12. For example, the software components include an operating system 122, and a distribution controlling module 102.

The operating system 122 (e.g., Darwin, RTXC, LINUX, UNIX, OS X, WINDOWS) includes various software components and/or drivers for controlling and managing general system tasks (e.g., memory management, storage device control, power management, etc.) and facilitates communication between various hardware and software components.

The distribution controlling module 102 includes an IDC querying module 105, a route assigning module 106, a transmission status querying module 107 and a transmission status updating module 108.

The IDC identifying module 105 is configured for receiving an IDC querying quest from a device (e.g., a server in the first IDC 110 or the second IDC 120), querying the IDC that the device belongs, and returning the querying result (i.e., including an IDC identifier) to the device. The information describing the relation between the devices and IDCs can be stored in a database or a data file.

The route assigning module 106 is configured for receiving a route querying quest from a device, querying available route modules in an IDC designated in the route querying quest, and returning the querying result (i.e., including a route identifier) to the device. The above route modules are one or more software components installed in a server for managing internet channels of a certain IDC. The route modules are capable of sending data to other IDCs according to requests. The route modules can be deployed in a channel device, such as a router, of the IDCs.

The transmission status querying module 106 is configured for receiving a transmission status querying quest from a device, querying a transmission status of a target device designated in the transmission status querying quest, and returning the querying result to the device. The transmission status updating querying module 108 is configured for updating a transmission status of a device according to a transmission status updating request.

The aforementioned transmission status is shown in table 1 as follows.

TABLE 1 transmission status definitions

| Transmission status | Description |
| --- | --- |
| Waiting for source | Waiting for a transmission source device |
| Waiting for transmission | Sending transmission instruction and waiting for transmission |
| Waiting for route | Waiting for the distribution controlling module 102 returns available route modules |
| Transmitting | Response is received and transmission starts |
| Waiting for the first transmission | An intermediate state of inter-IDC transmission, and this state indicates devices are waiting for the first receiving end in the IDC finishing the transmission |
| First transmission completed | An intermediate state of inter-IDC transmission, the first receiving end in a target IDC finishes the transmission, and this state indicates that a notification is already sent to a content distribution module to start the transmission |
| Transmission completed | A receiving end completes the transmission |

It is to be noted that the state codes used for the transmission status is not limited as the above table, and any codes can be employed by the present embodiment.

Figure 3:
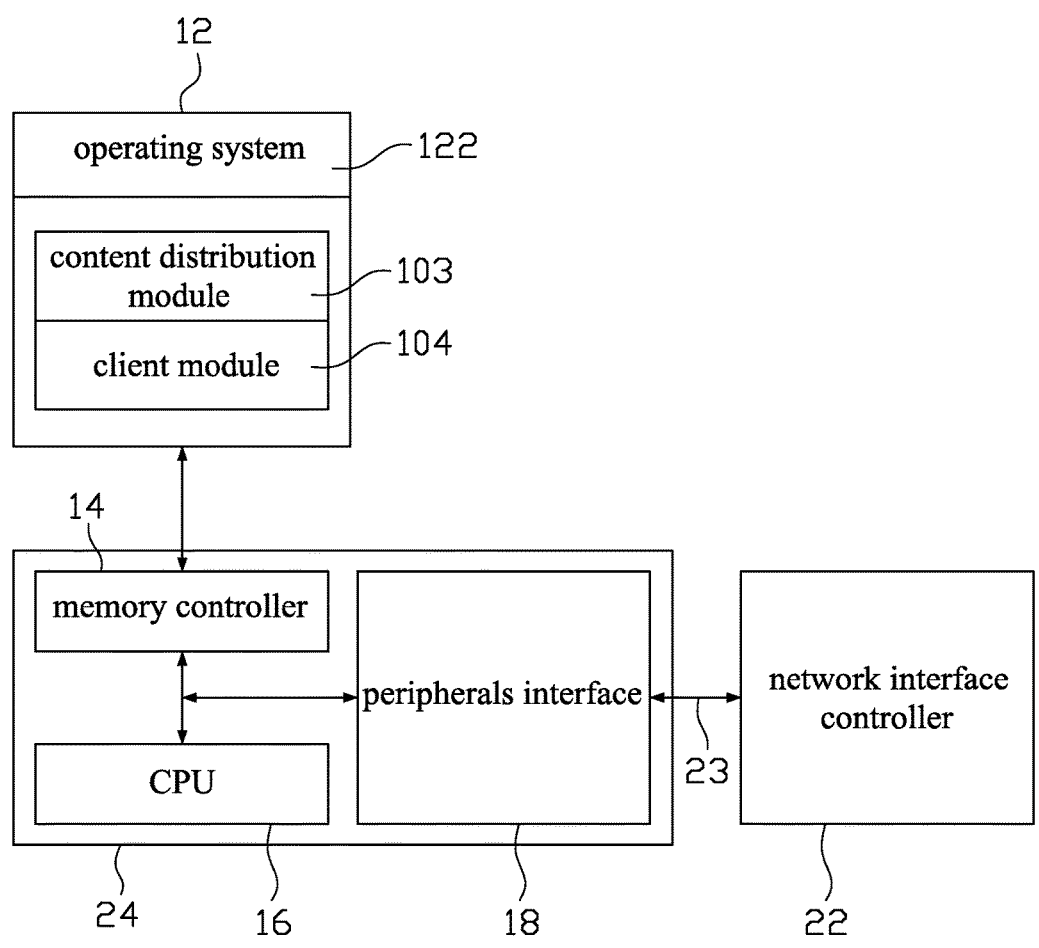
FIG. 3 is a block diagram of another server in the virtual IDC shown in FIG. 1.

Referring to FIG. 3, the server 111 is similar to the distribution controlling server 101, except the software components installed in the server 111 is different with that in the distribution controlling server 101. As shown in FIG. 3, the server 111 may not include the distribution controlling module 102, but include a content distribution module 103, and a client module 104. Furthermore, the server may only include the content distribution module 103, or only include the client module 104. Generally, at least one content distribution module 103 should be included in an IDC (e.g., the first IDC 110 or the second IDC 120). Thus, the first IDC 110 and the second IDC 120 both have a server 111 including the content distribution module 103.

The content distribution module 103 is configured for controlling the content distribution in a same IDC (e.g., the first IDC 110 or the second IDC 120). The server 111 that includes the content distribution module 103 is also regarded as an internal controlling server. As described above, the first IDC 110 and the second IDC 120 both have a internal controlling server.

The client module 104 is configured for initializing a content distribution request. For example, the client module 104 could provide an interface for the user to select or edit content to be distributed, and designate all the receiving ends. The receiving ends are target devices (e.g., servers) in the first IDC 110 or the second IDC 120. The content is configured for being distributed to these target devices. The client module 104 further sends a content distribution request after detecting a predetermined user instruction. The content distribution request may include information describing the content to be distributed and all the receiving ends.

The client module 104 is further configured for transmitting the content to be distributed to an assigned receiving end according to a transmission instruction from the content distribution module 103; receiving content transmitted from other client modules 104; and returning a current transmission stat according to a querying request.

All the devices need to perform content distribution task should include the client module 104. Thus, the first IDC 110 and the second IDC 120 can both include a number of client modules 104 installed in different servers.

The IDC querying request, the route querying request, the transmission status querying request, and the transmission status updating request can be sent by the content distribution module 103 or the client module 104.

The distribution controlling server 101, the internal controlling server, and all the servers installing the client module 104 therein constitute a content distribution system.

Figure 4:
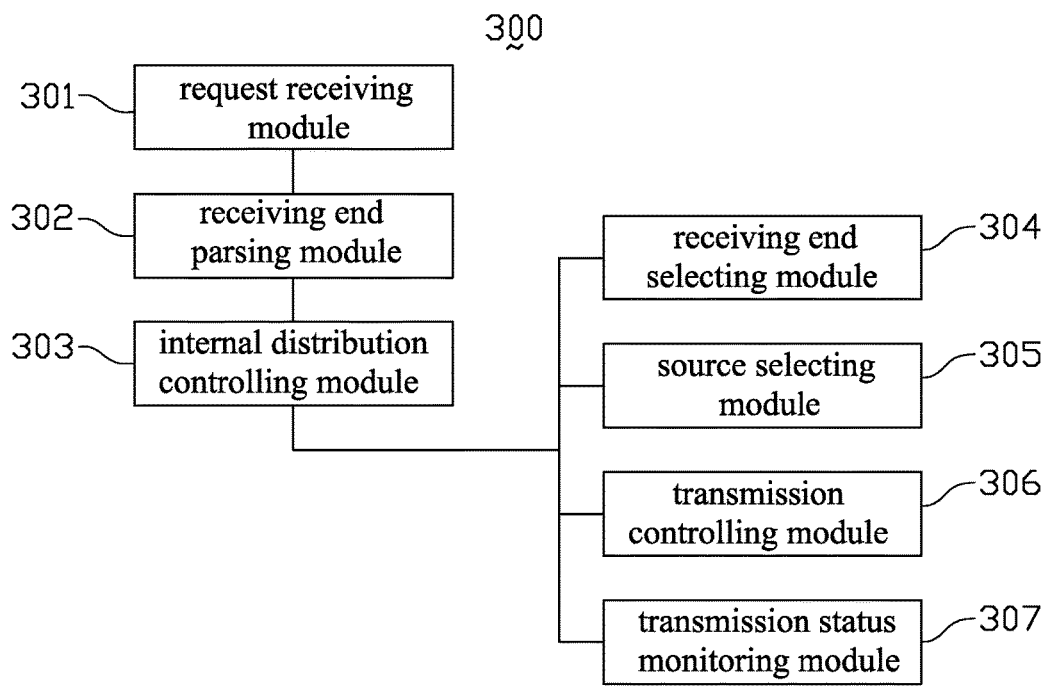
FIG. 4 is a block diagram of a content distribution module in accordance with a first embodiment.

FIG. 4 is a block diagram of the content distribution module 103. As shown in FIG. 4, the content distribution module 103 includes a request receiving module 301, a receiving end parsing module 302, an internal distribution controlling module 303, a receiving end selecting module 304, a source selecting module 305, a transmission controlling module 306, and a transmission status monitoring module 307.

The request receiving module 301 is configured for receiving a content distribution request from a client. The client is a device that includes the client module 104. The content distribution request can be sent by the client module 104 in the client. The client module 104 and the client are of a one-one correspondence. In other words, the request receiving module 301 is also configured for receiving a content distribution request from the client module 104.

The receiving end parsing module 302 is configured for parsing the content distribution request received by the request receiving module 301 to extract all the receiving ends included in the request, and mark at least a portion of the receiving ends as a transmission status of "waiting for source". The receiving ends should also include the client module 104, and the receiving ends may be in different IDCs. The at least a portion of the receiving ends are all the receiving ends in a same IDC. Marking the transmission status of the receiving ends, for example, means storing the transmission status of the receiving ends in a database. Specifically, identifiers of receiving ends and the transmission status (see Table 1) can be sent to the distribution controlling module 102 and the content distribution module 102 stores them in the database.

The receiving end selecting module 304 is configured for selecting a first receiving end from the at least a portion of the receiving ends. The first receiving end may be selected randomly, or according to a certain order (e.g., in the character order of identifiers of the receiving ends). After selecting the first receiving end, the first receiving end could be marked with a transmission status of "waiting for transmission".

The source selecting module 305 is configured for selecting a first source end from available source ends for the first receiving end. The available source ends includes the client (or the client module) that initializes the content distribution request and all the receiving ends having a transmission status of "transmission completed" in the at least a portion of the receiving ends.

The transmission controlling module 306 is configured for sending a transmission instruction to the first source end such that the first source end starts to send the content to the first receiving end. In detail, the transmission instruction is sent to the client module 104 that are installed in the first source end. Then, the client module 104 performs the content transmission task. After sending the transmission instruction to the first source end and receiving a response from the first source end, the first source end can be marked with a transmission status of "transmitting".

The transmitting state monitoring module 307 is configured for querying the transmission status of the first source end and updating the transmission status of the first source end as "transmission completed" after the transmission is completed. Each time after the transmission controlling module 306 sends the transmission instruction to a different source end (e.g., the first source end), the source end can be added into a watching list. Then, the transmitting state monitoring module 307 can send transmission status querying request to all the source ends included in the watching list periodically to query the transmission status. The transmitting state monitoring module 307 further updates the transmission status of the receiving ends that stored in the database according to the querying results.

Figure 5:
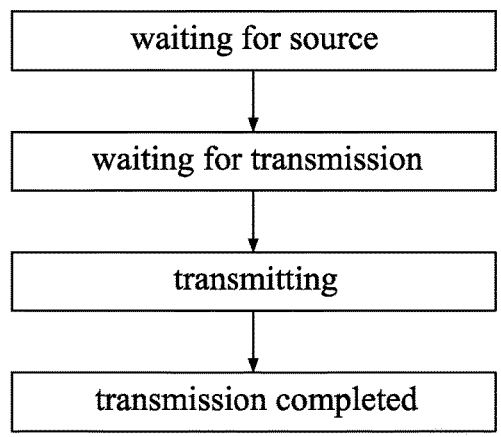
FIG. 5 is a flow chart illustrating a varying process of a transmission status of a receiving end in the virtual IDC shown in FIG. 1.

As described above, in different stages, the first receiving end may have a transmission status of: waiting for source, waiting for transmission, transmitting and transmission completed, and a varying process of the transmission status is shown in FIG. 5.

The internal distribution controlling module 303 is configured for judging whether all the receiving ends having a transmission status of "transmission completed". If no, the internal distribution controlling module 303 sends instructions to the receiving end selecting module 304, the source selecting module 305, the transmission controlling module 306, and the transmission status monitoring module 307 thereby continuing the distribution process until all the receiving ends having the transmission status of "transmission completed".

By marking the transmission status of the receiving ends, the content distribution module 103 could employ a receiving end that having a transmission status of "transmission completed" as a source end. As a result, the number of the source ends increases as the distribution process continues, a transmission rate increases gradually, and distribution efficiency is improved significantly.

Figure 6:
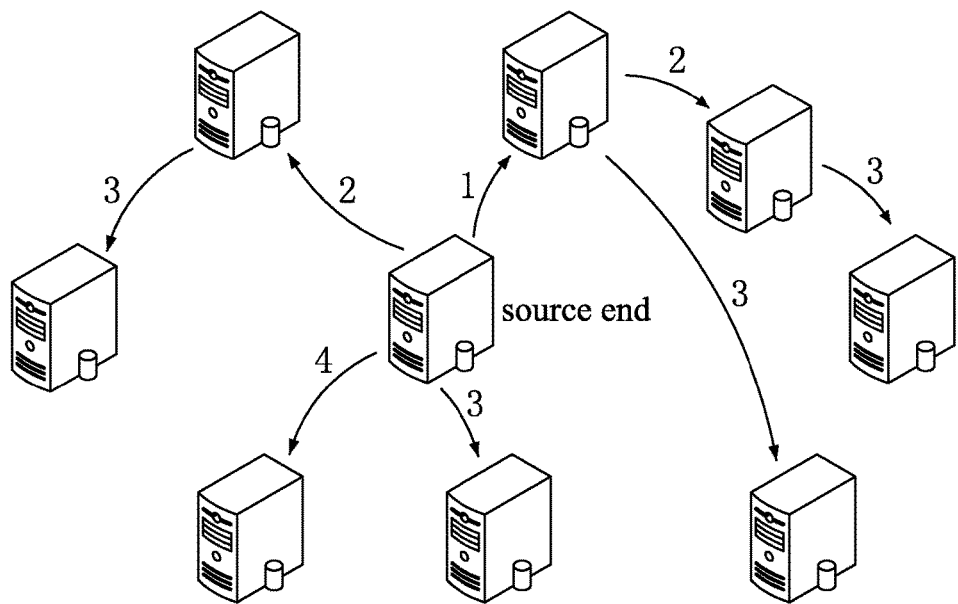
FIG. 6 is a schematic view showing an internal content distribution process in accordance with a first embodiment.

To illustrate the advantages of the content distribution module 103, FIG. 6 shows a distribution process between multiple receiving ends in a same IDC. A number around the arrow shown in FIG. 6 indicates a transmission order. After finishing the first transmission, there are two available source ends (the client initializing the content distribution request and the first receiving ends, and there are four source ends after the second batch of transmission. As shown in FIG. 6, the number of the source ends grows exponentially, and thus the transmission rate is improved significantly.

Figure 7:
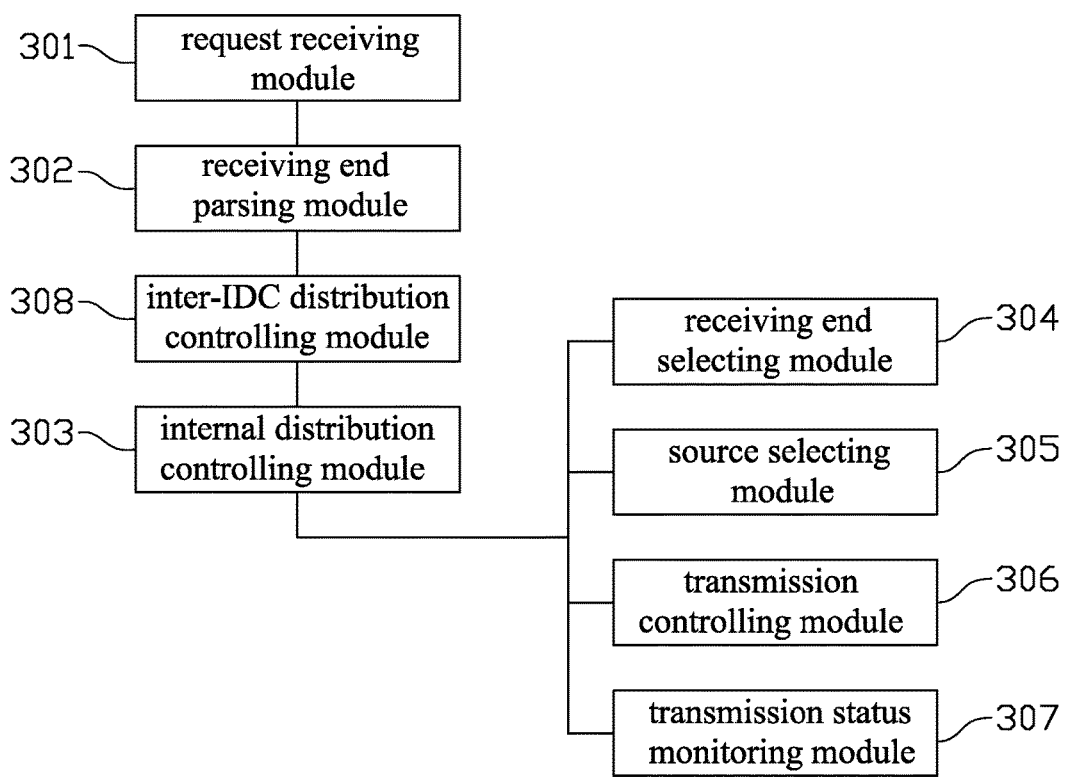
FIG. 7 is a block diagram of a content distribution module in accordance with a second embodiment.

FIG. 7 is a block diagram of the distribution controlling module 103 in accordance with another embodiment. As shown in FIG. 7, the content distribution module 103 further includes an inter-IDC distribution controlling module 308. The inter-IDC distribution controlling module 308 is executed prior to the internal distribution controlling module 303 is executed.

Figure 8:
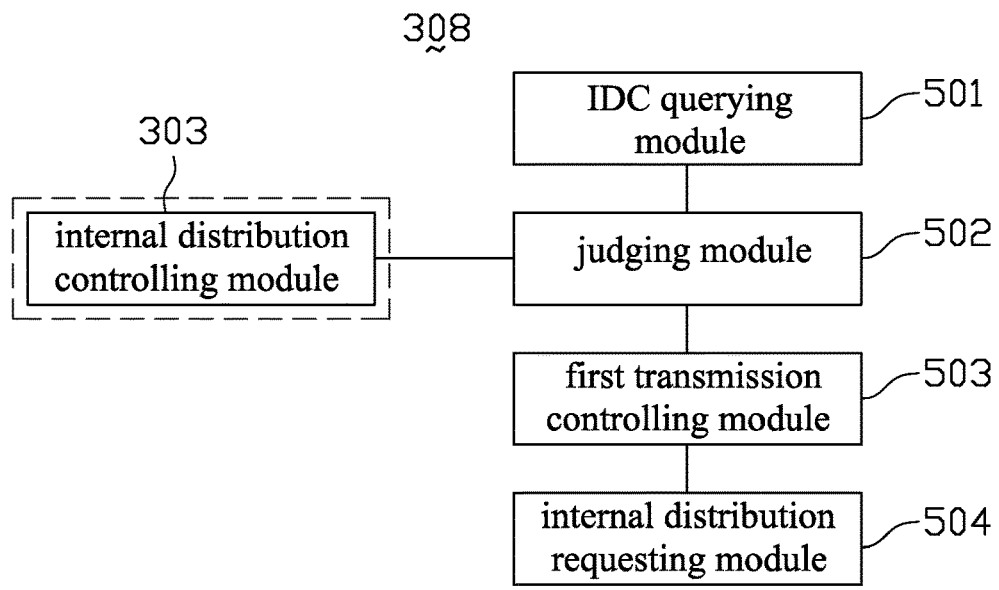
FIG. 8 is a block diagram of a distribution controlling module shown in FIG. 7.

Referring to FIG. 8, the internal distribution controlling module 303 includes an IDC querying module 501, a judging module 502, a first transmission controlling module 503 and an internal distribution requesting module 504.

The IDC querying module 501 is configured for querying all the IDCs corresponding to all the receiving ends. In detail, the IDC querying module 501 sends an IDC querying request to the distribution controlling module 102, and the IDC querying request may include identifiers of all the receiving ends. The distribution controlling module 102 querying IDCs that the receiving ends belongs according to the identifiers, and returning the querying result to the IDC querying module 501.

The judging module 502 is configured for calling different modules according to the querying result of the IDC querying module 501. Specifically, if all the receiving ends are located within a same IDC, the judging module 502 calls the internal distribution controlling module 303; otherwise the judging module 502 calls the first transmission controlling module 503. If all the receiving ends are in a same IDC, a current distribution task could be defined as an internal distribution task, and a process flow of a current distribution task can be referred back to FIG. 4 and related descriptions.

The first transmission controlling module 503 is configured for judging whether there is at least one receiving end marked with "transmission completed" for each of the IDCs. If not, the first transmission controlling module 503 performing the following steps until all the IDCs having at least one receiving end marked with "transmission completed".

First, the first transmission controlling module 503 obtain a target IDC from the IDCs, wherein the target IDC doesn't include any receiving end marked with "transmission completed".

Then, the first transmission controlling module 503 selects a target receiving end in the target IDC. The target receiving end can be selected randomly or according to a predetermined rule from receiving ends belong to the target IDC.

After that, the first transmission controlling module 503 controls a source end to send the content to the target receiving end. Specifically, the first transmission controlling module 503 selects a second source end from all the available source ends, querying available route modules, sends a transmission instruction to the second source end for controlling the second source end to send the content to the target receiving end using the available route modules.

The internal distribution requesting module 504 is configured for sending an internal distribution request to the target IDC if the target receiving end is marked with "transmission completed". Receiving ends designated by the internal distribution request may include all the receiving ends in the target IDC excepting the target receiving end, and a source end designated by the internal distribution request would be the target receiving end. The internal distribution request can be sent to the content distribution module 103 deployed in the target IDC.

As the content distribution module 103 of the present embodiment need to control distribution task between different IDCs, and a controlling process is more complicated. To achieve better controlling, more state codes (Transmission status) for the receiving ends should be used.

Figure 9:
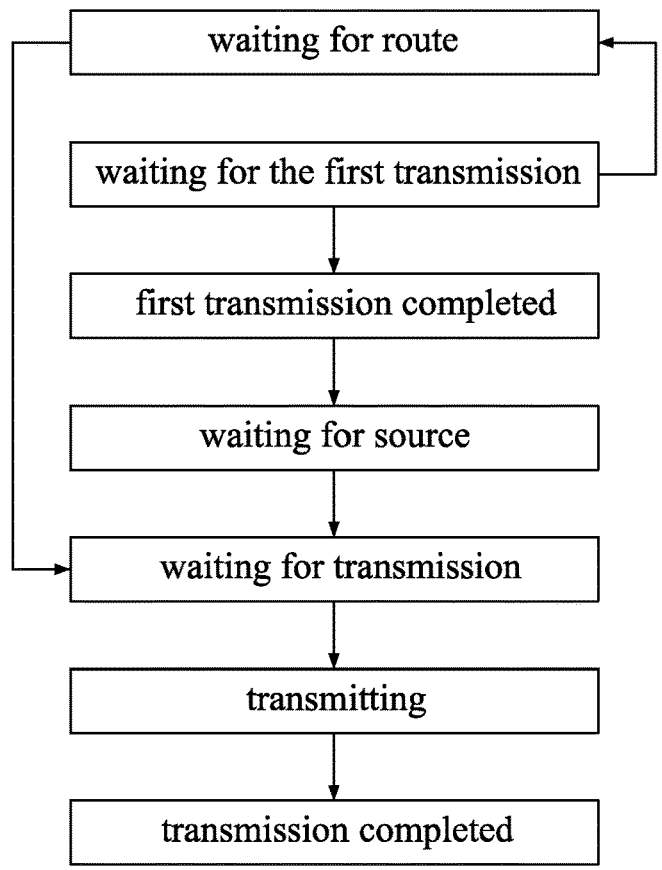
FIG. 9 is a flow chart illustrating a varying process of a transmission status of a receiving end in accordance with the second embodiment.

FIG. 9 is a schematic view showing an evolution progress of transmission status of receiving ends according to the present embodiment. For the target IDC, all the receiving ends are marked with "waiting for the first transmission" at the initial stage. After selecting the target receiving end, the target receiving end can be marked with "waiting for route".

After available route modules are obtained the target receiving end can be marked with "wait for transmission". After sending the transmission instruction to the second source end and receiving a response from the second source end, the target receiving end can be marked with "transmitting" After the transmission is completed, the target receiving end can be marked with "transmission completed, and the other receiving ends in the target IDC can be marked with "first transmission completed". After sending the internal distribution request to the content distribution module 103 in the target IDC, the other receiving ends can be marked with "waiting for source". Then, the transmission status of all the receiving ends in the target IDC is similar to that shown in FIG. 5, the internal distribution task in the target IDC can be performed with a similar process.

As described above, the content distribution module 103 deliveries the content to a receiving end in each IDC, and then sends an internal distribution request to each IDC. Each IDC would finish the following internal distribution task employing the receiving end mark with "transmission completed" as the source end. This manner achieves the following advantages, first, the inter-IDC transmission is only required to perform one time for each IDC, and the network traffic consumed in the distribution task is reduced. In addition, the inter-IDC transmission task can be converted into several internal transmission tasks performed synchronously, and thus the distribution efficiency is improved significantly.

Figure 10:
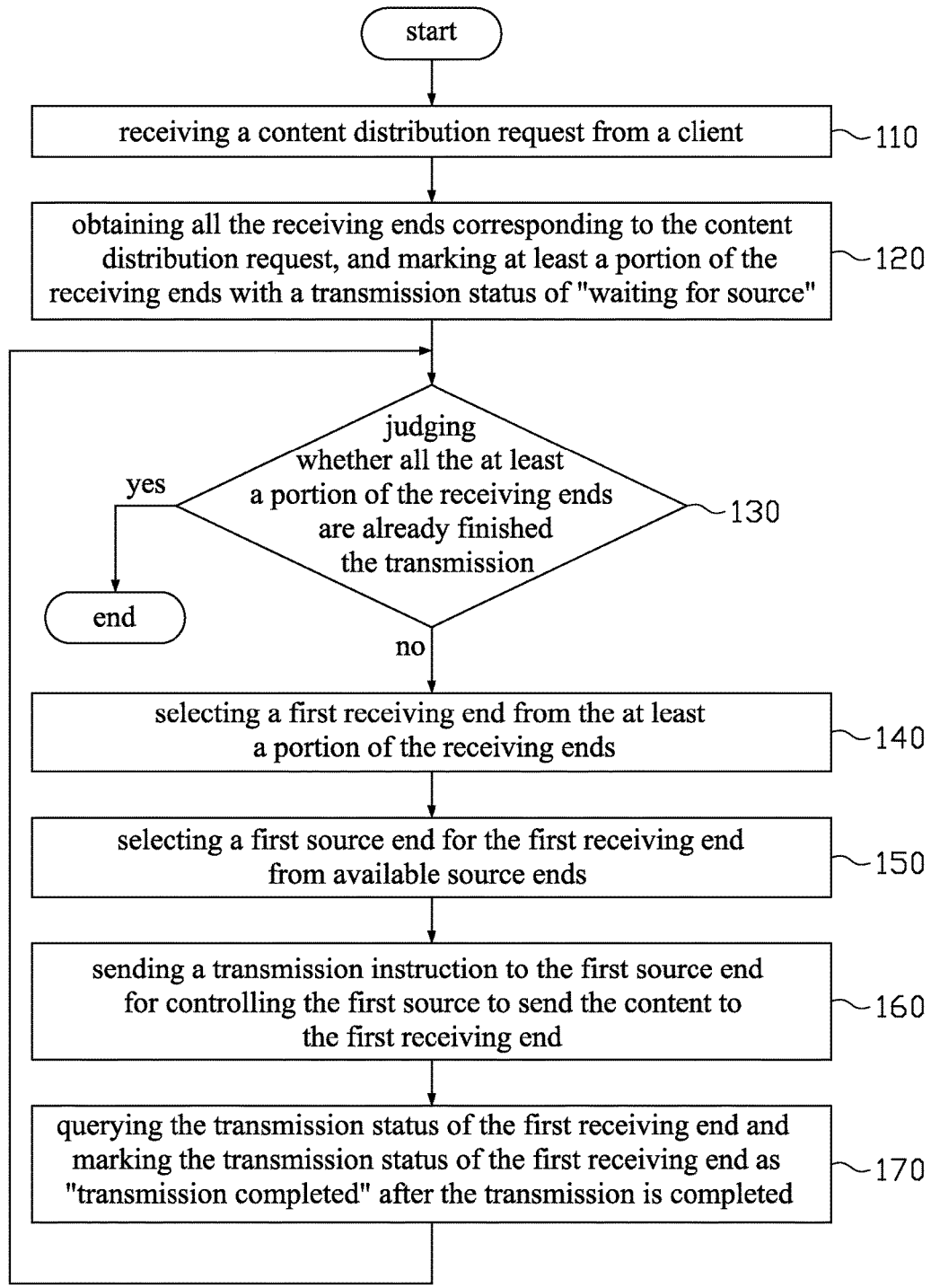
FIG. 10 is a flow chart of a content distribution method in accordance with a third embodiment.

FIG. 10 is a flow chart of a content distribution method in accordance with an embodiment. The method can be performed by the internal distribution controlling server. As shown in FIG. 10, the method may include the following steps.

Step 110, receiving a content distribution request from a client.

The client, for example, is a device that located within the first IDC 110, the second IDC 120, or other network systems. The client may include the client module 104. Users can the content distribution request via the client module. The content distribution request may include the content to be distributed and all the receiving ends.

Step 120, obtaining all the receiving ends corresponding to the content distribution request, and marking at least a portion of the receiving ends with a transmission status of "waiting for source".

The receiving ends may be located within different IDCs. The at least a portion of the receiving ends are receiving ends that are located within a same IDC. Marking the transmission status of the receiving ends means storing the transmission status in a database.

Step 130 (distribution controlling step), judging whether all the at least a portion of the receiving ends are already finished the transmission. If not, the following steps is repeated until all the at least a portion of the receiving ends are already finished the transmission.

Step 140, selecting a first receiving end from the at least a portion of the receiving ends. During this process, the first receiving end can be selected randomly, or according to a certain order (e.g., the character order of identifiers of the receiving ends).

Step 150, selecting a first source end for the first receiving end from available source ends. The available source ends includes all receiving ends in the at least a portion of the receiving ends that are marked with "transmission completed".

Step 160, sending a transmission instruction to the first source end for controlling the first source to send the content to the first receiving end. Specifically, the transmission instruction is sent to the client module 104 installed in the first source end, and the client module 104 performs the transmission task.

Step 170, querying the transmission status of the first receiving end and marking the transmission status of the first receiving end as "transmission completed" after the transmission is completed.

Each time after performing the step 160, a corresponding source end (e.g., the first source end) can be included in a watching list. Then, a transmission status querying request can be sent to each source end included in the watching list periodically to query the transmission status of the source ends Accordingly, transmission status of the receiving ends that are stored in the database can be updated according to the querying result.

By marking the transmission status of the receiving ends, the method of the present embodiment could employ a receiving end that having a transmission status of "transmission completed" as a source end. As a result, the number of the source ends increases as the distribution process continues, a transmission rate increases gradually, and the distribution efficiency is improved significantly.

Figure 11:
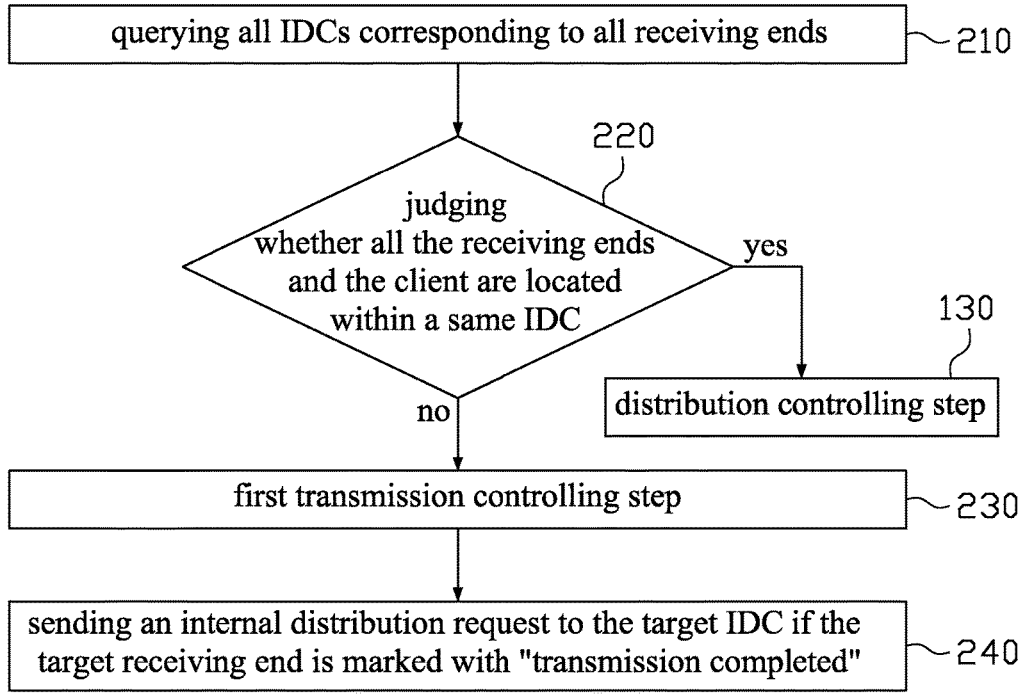
FIG. 11 is a flow chart of a content distribution method in accordance with a fourth embodiment.

FIG. 11 is a flow chart of a content distribution method in accordance with another embodiment. The method can be executed by an information processing device such as a server. As shown in FIG. 11, the method is similar to the method shown in FIG. 10, but the method of the present embodiment further includes following steps between the step 120 and the step 130.

Step 210, querying all IDCs corresponding to all receiving ends.

Step 220, judging whether all the receiving ends and the client are located within a same IDC. If all the receiving ends and the client are located within a same IDC, a distribution controlling step (FIG. 10, step 130) is executed; otherwise a step 230 is executed.

Step 230 (first transmission controlling step), judging whether there is at least one receiving end marked with "transmission completed" for each of the IDCs. If not, the first transmission controlling step (the step 230) is repeated until all the IDCs having at least one receiving end marked with "transmission completed".

Figure 12:
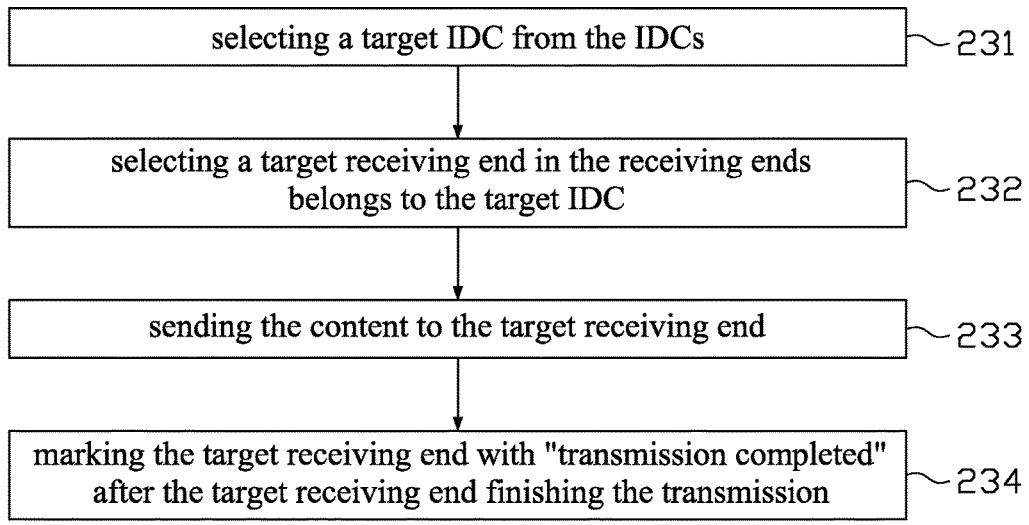
FIG. 12 is a flow chart of a content distribution method in accordance with a fifth embodiment.

Referring to FIG. 12, the step 230 includes the following steps.

Step 231, selecting a target IDC from the IDCs, wherein the target IDC doesn't include any receiving end marked with "transmission completed".

Step 232, selecting a target receiving end in the receiving ends belongs to the target IDC. The target receiving end can be selected randomly or according to a predetermined rule from receiving ends belong to the target IDC.

Step 233, sending the content to the target receiving end. The step 233 may include the following steps: selecting a second source end from all the available source ends, querying available route modules, sends a transmission instruction to the second source end for controlling the second source end to send the content to the target receiving end using the available route modules. The available source ends, for example, may include the client or any receiving end in the all the receiving ends marked with "transmission completed". The route modules can be queried to the distribution controlling module 102 installed in the distribution controlling server 101.

Step 234, marking the target receiving end with "transmission completed" after the target receiving end finishing the transmission.

In addition, referring to FIG. 11, the method of the present embodiment further includes:

Step 240, sending an internal distribution request to the target IDC if the target receiving end is marked with "transmission completed". Receiving ends designated by the internal distribution request may include all the receiving ends in the target IDC excepting the target receiving end, and a source end designated by the internal distribution request would be the target receiving end. The internal distribution request can be sent to the content distribution module 103 deployed in the target IDC.

As described above, the method of the present embodiment deliveries the content to a receiving end in each IDC, and then sends an internal distribution request to each IDC. Each IDC would finish the following internal distribution task employing the receiving end mark with "transmission completed" as the source end. This manner achieves the following advantages, first, the inter-IDC transmission is only required to perform one time for each IDC, and the network traffic consumed in the distribution task is reduced. In addition, the inter-IDC transmission task can be converted into several internal transmission tasks performed synchronously, and thus the distribution efficiency is improved significantly.

Although certain embodiments of the present disclosure have been specifically described, the present disclosure is not to be constructed as being limited thereto. Various changes or modifications may be made to the present disclosure without departing from the scope and spirit of the present disclosure.

What is claimed is:

1. A content distribution method, configured for being executed by a content distribution network (CDN) or an internet data center (IDC) to perform a content distribution task, the method comprising:
   receiving a content distribution request form a client;
   obtaining all receiving ends designated by the content distribution request, and marking at least a portion of the receiving ends with a first status code, which indicates a transmission status of waiting for a transmission source;
   in response to all the receiving ends and the client being located within a same IDC:
      judging whether the at least a portion of the receiving ends have completed the distribution task;
      selecting a plurality of first receiving ends from the at least a portion of the receiving ends in response to determining that not all of the at least a portion of the receiving ends have completed the distribution task;
      selecting a plurality of first source ends, none of which is included in the plurality of first receiving ends, from available source ends for sending content to be distributed to the plurality of first receiving ends, wherein the available source ends comprise the client and receiving ends in the at least a portion of the receiving ends that have completed the transmission;
      sending a transmission instruction to the plurality of first source ends for controlling the plurality of first source ends to send content to be distributed to the plurality of first receiving ends; and
      querying a transmission status of the plurality of first receiving ends and marking the plurality of first receiving ends with a second status code, which indicates a transmission status of transmission completed, after the plurality of first receiving ends have completed the distribution task; and
   in response to all the receiving ends and the client being located within different IDCs:
      selecting a target IDC;
      selecting a target receiving end from receiving ends belong to the target IDC, in response to no receiving end belonging to the target IDC completing the distribution task;
      sending content to be distributed to the target receiving end from the client and/or further receiving ends that have completed the distribution task, wherein the client and the further receiving ends belong to a further IDC different from the target IDC; and
      prohibiting content to be distributed from being sent to the receiving ends belong to the target IDC from the client and the further receiving ends in response to the target receiving end having completed the distribution task.

2. The method of claim 1, wherein the CDN or the IDC comprises a distribution controlling server, and the method further comprises:
   querying all IDCs corresponding to all the receiving ends from the distribution controlling server.

3. The method of claim 2, further further comprising:
   marking the target receiving end with the second status code.

4. The method of claim 3, the step of sending content to be distributed to the target receiving end comprising:
   selecting a second source end from the available source ends;
   querying available route modules from the distribution controlling server, wherein the route modules are configured for transmitting data via the internet; and
   sending a transmission instruction to the second source end for controlling the second source end to send the content to be distributed to the target receiving end via the available route modules.

5. The method of claim 3, the method further comprising:
   sending an internal distribution request to the target IDC in response to determining that the target IDC has at least one receiving end that has completed the distribution task, wherein receiving ends designated by the internal distribution request comprises all receiving ends belonging to the target IDC, and the internal distribution request is configured for starting an internal distribution task in the target IDC for distributing the content in the target IDC.

6. A server in a content distribution network (CDN) or an internet data center (IDC), the server comprising:
   memory;
   one or more processors; and
   one or more executable instructions stored in the memory and configured for being executed by the one or more processors, thereby causing the one or more processors to perform a method comprising:
      receiving a content distribution request form a client;
      obtaining all receiving ends designated by the content distribution request, and marking at least a portion of the receiving ends with a first status code, which indicates a transmission status of waiting for a transmission source;
   in response to all the receiving ends and the client being located in a same IDC:
      judging whether the at least a portion of the receiving ends have completed the distribution task;
      selecting a plurality of first receiving ends from the at least a portion of the receiving ends in response to determining that not all of the at least a portion of the receiving ends have completed the distribution task;

selecting a plurality of first source ends, none of which is included in the plurality of first receiving ends, from available source ends for sending content to be distributed to the plurality of first receiving ends, wherein the available source ends comprise the client and receiving ends in the at least a portion of the receiving ends that have completed the transmission;

sending a transmission instruction to the plurality of first source ends for controlling the plurality of first source ends to send content to be distributed to the plurality of first receiving ends; and querying a transmission status of the plurality of first receiving ends and marking the plurality of first receiving ends with a second status code, which indicates a transmission status of transmission completed, after the plurality of first receiving ends have completed the distribution task; and in response to all the receiving ends and the client being located within different IDCs:
selecting a target IDC;
selecting a target receiving end from receiving ends belong to the target IDC, in response to no receiving end belonging to the target IDC completing the distribution task;
sending content to be distributed to the target receiving end from the client and/or further receiving ends that have completed the distribution task, wherein the client and the further receiving ends belong to a further IDC different from the target IDC; and
prohibiting content to be distributed from being sent to the receiving ends belong to the target IDC from the client and the further receiving ends in response to the target receiving end having completed the distribution task.

7. The server of claim 6, wherein the CDN or the IDC comprises a distribution controlling server and the method further comprises:
querying all IDCs corresponding to all the receiving ends from the distribution controlling server.

8. The server of claim 7, wherein the method further comprises:
marking the target receiving end with the second status code.

9. The server of claim 8, the step of sending content to be distributed to the target receiving end comprising:
selecting a second source end from the available source ends;
querying available route modules from the distribution controlling server, wherein the route modules are configured for transmitting data via the internet; and
sending a transmission instruction to the second source end for controlling the second source end to send the content to be distributed to the target receiving end via the available route modules.

10. The server of claim 8, the method further comprising:
sending an internal distribution request to the target IDC in response to determining that the target IDC has at least one receiving end that has completed the distribution task, wherein receiving ends designated by the internal distribution request comprises all receiving ends belonging to the target IDC, and the internal distribution request is configured for starting an internal distribution task in the target IDC for distributing the content in the target IDC.

11. A content distribution system, deployed in a content distribution network (CDN) or an internet data center (IDC), the system comprising:
a client, an internal controlling hardware server and receiving ends;
the client configured to send a content distribution request to the internal controlling server;
the internal controlling server configured to:
receive the content distribution server from the client;
obtain all receiving ends designated by the content distribution request, and marking at least a portion of the receiving ends with a first status code, which indicates a transmission status of waiting for a transmission source;
in response to all the receiving ends and the client being located in a same IDC:
judge whether the at least a portion of the receiving ends have completed the distribution task;
select a plurality of first receiving ends from the at least a portion of the receiving ends in response to determining that not all of the at least a portion of the receiving ends have completed the distribution task;
select a plurality of first source ends, none of which is included in the plurality of first receiving ends, from available source ends for sending content to be distributed to the plurality of first receiving ends, wherein the available source ends comprise the client and receiving ends in the at least a portion of the receiving ends that have completed the transmission;
send a transmission instruction to the plurality of first source ends for controlling the plurality of first source ends to send content to be distributed to the plurality of first receiving ends; and
query a transmission status of the plurality of first receiving ends and marking the plurality of first receiving ends with a second status code, which indicates a transmission status of transmission completed, after the plurality of first receiving ends have completed the distribution task; and
in response to all the receiving ends and the client being located within different IDCs:
select a target IDC;
select a target receiving end from receiving ends belong to the target IDC, in response to no receiving end belonging to the target IDC completing the distribution task;
send content to be distributed to the target receiving end from the client and/or further receiving ends that have completed the distribution task, wherein the client and the further receiving ends belong to a further IDC different from the target IDC; and
prohibit content to be distributed from being sent to the receiving ends belong to the target IDC from the client and the further receiving ends in response to the target receiving end having completed the distribution task.

12. The content distribution system of claim 11, wherein the system further comprises a distribution controlling server configured to query and returning IDCs corresponding to receiving ends designated in a request;
the internal controlling server further configured to query all IDCs corresponding to all the receiving ends from the distribution controlling server.

13. The content distribution system of claim 12, wherein the internal controlling server is further configured to:
  mark the target receiving end with the second status code.

14. The content distribution system of claim 13, wherein the internal controlling server is configured to sending content to be distributed to the target receiving end by:
  selecting a second source end from the available source ends;
  querying available route modules from the distribution controlling server, wherein the route modules are configured for transmitting data via the internet; and
  sending a transmission instruction to the second source end for controlling the second source end to send the content to be distributed to the target receiving end via the available route modules.

15. The content distribution system of claim 13, wherein the internal controlling server is further configured to:
  send an internal distribution request to the target IDC in response to determining that the target IDC has at least one receiving end that has completed the distribution task, wherein receiving ends designated by the internal distribution request comprises all receiving ends belonging to the target IDC, and the internal distribution request is configured for starting an internal distribution task in the target IDC for distributing the content in the target IDC.

16. The method of claim 1, further comprising:
  sending another transmission instruction to at least one of the plurality of first source ends to control the at least one of the plurality of first source ends to send the content to be distributed to at least a second receiving end of the at least a portion of the receiving ends, in response to the at least one of the plurality of first source ends completing sending the content to be distributed to ones of the plurality of first receiving end.

17. The server of claim 6, wherein the method further comprises:
  sending another transmission instruction to at least one of the plurality of first source ends to control the at least one of the plurality of first source ends to send the content to be distributed to at least a second receiving end of the at least a portion of the receiving ends, in response to the at least one of the plurality of first source ends completing sending the content to be distributed to ones of the plurality of first receiving end.

18. The content distribution system of claim 11, wherein the internal controlling server is further configured to:
  send another transmission instruction to at least one of the plurality of first source ends to control the at least one of the plurality of first source ends to send the content to be distributed to at least a second receiving end of the at least a portion of the receiving ends, in response to the at least one of the plurality of first source ends completing sending the content to be distributed to ones of the plurality of first receiving end.

* * * * *